(No Model.)
C. T. SCHOEN.
BRAKE SHOE.
No. 520,900. Patented June 5, 1894.
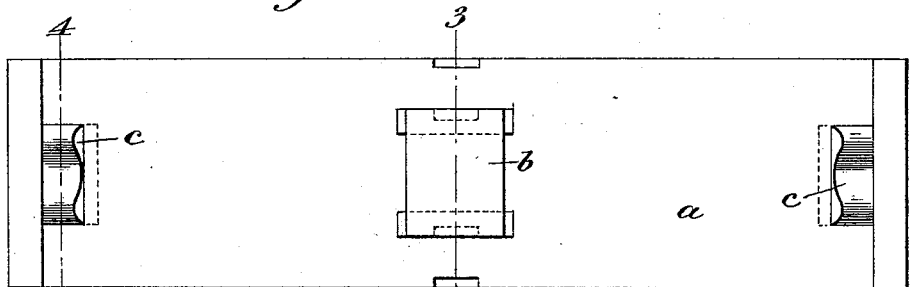
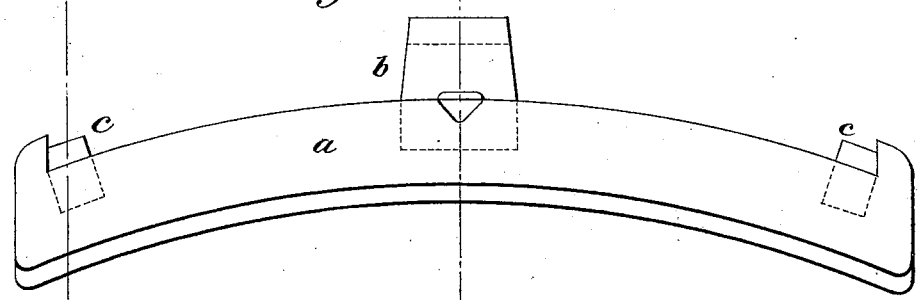
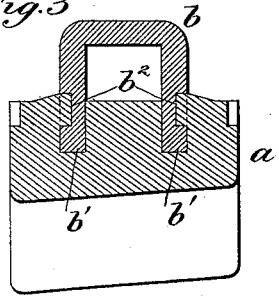 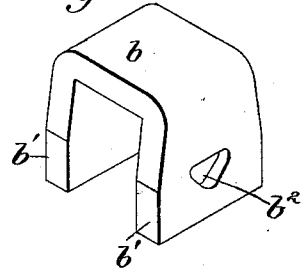
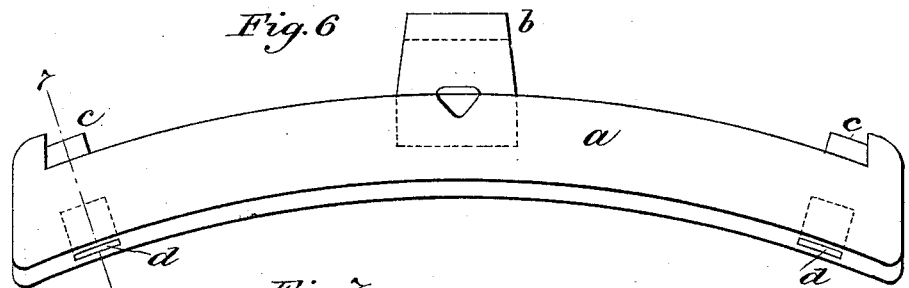
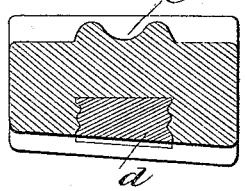
Witnesses
J. T. Coleman
E. A. Fincrell
Inventor
Charles T. Schoen
by Wm N. Fincrell
his atty.
THE NATIONAL LITHOGRAPHING COMPANY,
WASHINGTON, D. C.

UNITED STATES PATENT OFFICE.

CHARLES T. SCHOEN, OF ALLEGHENY, PENNSYLVANIA, ASSIGNOR TO THE SCHOEN BRAKE SHOE COMPANY, OF SAME PLACE.

BRAKE-SHOE.

SPECIFICATION forming part of Letters Patent No. 520,900, dated June 5, 1894.

Application filed October 28, 1893. Serial No. 489,401. (No model.)

*To all whom it may concern:*

Be it known that I, CHARLES T. SCHOEN, a citizen of the United States, residing at Allegheny, in the county of Allegheny and State of Pennsylvania, have invented a certain new and useful Improvement in Brake-Shoes, of which the following is a full, clear, and exact description.

In my Letters Patent No. 481,973, granted September 6, 1892, I have set forth a brake shoe having the clip embedded therein, and in the companion Patent No. 484,866, granted October 25, 1892, I have set forth the method of and apparatus for manufacturing such shoe. In my Letters Patent No. 513,655, granted January 30, 1894, I have set forth a method of inserting the clip by causing it to act as a punch in forcing itself into and through the shoe and in my Letters Patent No. 513,656, granted January 30, 1894, I have set forth the specific form of shoe illustrating the method of the patent last above mentioned and also other shoes made in accordance with said method or otherwise.

The nature of the present invention, broadly considered, consists in a brake shoe having an inserted clip which is united with the shoe by forcing the said clip part way into but not through the shoe and causing the metal of the shoe to interlock with the clip.

Another feature of my invention is the formation of the end lugs of inserted pieces forced into the shoe.

In the accompanying drawings illustrating my invention, in the several figures of which like parts are similarly designated, Figure 1 is a top or back plan view, and Fig. 2 a side elevation of a brake shoe of the master-car-builders' standard, and illustrating one form of inserted end lugs. Fig. 3 is a cross-section taken in the plane of line 3—3, Figs. 1 and 2. Fig. 4 is a cross-section taken in the plane of line 4—4, Figs. 1 and 2. Fig. 5 is a perspective view of the clip detached. Fig. 6 is a side elevation of a shoe having the inserted clip as in the other view and having the end lugs formed by inserted pieces forced into the shoe from its face or wearing side, and Fig. 7 is a cross-section taken in the plane of line 7—7, Fig. 6.

In the preferred construction, the shoe $a$ is of wrought metal, and in point of economy, soft steel is preferred. Wrought iron may be used because of its somewhat greater co-efficient of friction, but its durability probably is not as great as soft steel. The clip $b$ may be of cast iron or steel or wrought iron or steel, and this clip is in the shape of an inverted U, having the parallel limbs $b'$, $b'$ rather wider than the loop, and in the sides of these limbs I make the cavities $b^2$ of any approved shape. In applying the clip to the shoe, the latter is heated and placed in a suitable matrix to prevent spreading and give or retain final shape, and then the clip in a cold state is forced part way into the shoe until its limbs $b'$, $b'$ are buried in the shoe up to the upper portions of the cavities $b^2$, the clip, by preference, making holes for itself in the shoe as it is forced in, although the holes may be previously made as in my Patent No. 484,866, before referred to. The metal of the shoe shrinks, or subsides, into the cavities $b^2$ or, as indicated in Figs. 1 and 3, may be punched or upset into these cavities, in order to insure an interlocking or more complete union of the clip and shoe. Instead of cavities $b^2$, holes may be made clear through the limbs $b'$, $b'$, or, instead of holes or cavities, I may form projections on these limbs, or both projections and cavities may be used. As clearly shown in Fig. 3, the metal of the shoe engages the clip above the level of the back of the shoe, and thereby it is possible to wear the shoe down very thin without parting from the clip.

The gist of the invention is a clip adapted to be caused to force its way part way into the shoe, but not through it, and having some provision for interlocking with the shoe.

By the construction described a brake shoe may be supplied with its clip in a very expeditious and economical manner.

The end lugs $c$, used to prevent lateral movement of the shoe-heads, may be advantageously, quickly and cheaply supplied by similarly making them separately from the shoe and forcing them, in a cold state, into the shoe while the latter is hot. They may be forced into the shoe from its back, as in Figs. 1, 2 and 4, while the shoe is still straight, or after it is curved to shape, and may be provided with grooves, notches or corrugations $c'$, into which the metal of the shoe shrinks, subsides or is forced, or they may be dovetail in cross-section, in order the more perfectly to unite them and the shoe. Instead of thus forming the end-lugs, I may form them out of the metal of the back of the shoe by displacing such metal by forcibly inserting plugs or pieces $d$ in the face of the shoe, as in Figs. 6 and 7. These inserted pieces $d$ may be castings, and have notched, grooved, corrugated or dovetailed sides to assist in retaining them in the shoe, and they may be inserted cold into the hot shoe. By the use of these inserted pieces $d$ for raising the end-lugs, the face of the shoe is rendered composite, being composed of wrought and cast metal, and the advantages of such a wearing face are too well known to need recital here. But, I do not herein broadly claim making the composite face by inserted pieces since that is the subject of claim in my Letters Patent No. 513,656 hereinabove referred to. The shaping of the end-lugs, shown in Figs. 6 and 7, may be effected simultaneously with the inserting of the pieces $d$ or subsequently, as desired.

Any suitable press or other apparatus may be employed in carrying out my invention.

What I claim is—

1. A brake shoe having a U-shaped clip provided with essentially parallel limbs which are forced part-way into the metal of the shoe without passing entirely through the same, thereby to unite the clip and shoe, substantially as described.

2. A brake shoe having its clip and end-lugs made separately from the shoe and forced part way into it, without passing entirely through it, substantially as described.

3. A brake shoe provided with a clip having essentially parallel limbs constructed with interlocking devices, such as cavities, and having its said limbs embedded in the back of the shoe and the metal of the shoe engaging said interlocking devices on the said limbs, substantially as described.

4. A brake-shoe having its end-lugs formed of pieces forcibly inserted part-way in said shoe without passing entirely through it, substantially as described.

In testimony whereof I have hereunto set my hand this 27th day of October, A. D. 1893.

CHARLES T. SCHOEN.

Witnesses:
G. WHITNEY WOOD,
J. C. GRAFF.